(12) United States Patent
Franks et al.

(10) Patent No.: US 7,345,599 B2
(45) Date of Patent: Mar. 18, 2008

(54) COMPUTER KEYBOARD

(75) Inventors: Michael Franks, Seattle, WA (US);
Daniel G. O'Neil, Seattle, WA (US);
David M. Lane, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 178 days.

(21) Appl. No.: 11/382,703

(22) Filed: May 10, 2006

(65) Prior Publication Data
US 2007/0008289 A1 Jan. 11, 2007

Related U.S. Application Data

(63) Continuation-in-part of application No. 29/233,839, filed on Jul. 11, 2005, now Pat. No. Des. 523,433.

(51) Int. Cl.
*H03K 17/94* (2006.01)

(52) U.S. Cl. ......... 341/22; 345/168; 400/488; D14/396

(58) Field of Classification Search ......... 341/22; 345/168; D14/391–398; 400/488, 489
See application file for complete search history.

(56) References Cited

U.S. PATENT DOCUMENTS

| | | | |
|---|---|---|---|
| 5,673,040 A * | 9/1997 | Hargreaves et al. | ......... 341/22 |
| 5,892,503 A | 4/1999 | Kim | |
| 5,957,595 A | 9/1999 | Chen | |
| 6,268,806 B1 | 7/2001 | Frager | |
| D449,833 S * | 10/2001 | Prokop | ......... D14/396 |
| D464,051 S * | 10/2002 | Wu | ......... D14/392 |
| 6,545,668 B1 | 4/2003 | Hayama | |
| 6,986,614 B2 | 1/2006 | McLoone | |
| 2002/0164189 A1 | 11/2002 | Glassover | |
| 2005/0071437 A1 | 3/2005 | Bear | |
| 2005/0105951 A1 | 5/2005 | Risheq | |
| 2006/0038698 A1 | 2/2006 | Chen | |
| 2007/0001066 A1* | 1/2007 | Lane | ......... 248/118.1 |

FOREIGN PATENT DOCUMENTS

| | | |
|---|---|---|
| GB | 2412087 | 9/2005 |
| WO | WO2005041012 | 5/2005 |

OTHER PUBLICATIONS

KB-21e Scroll http://www.geniusnet.com.tw/product/product-1.asp?pdtno=46, 2005.
Genius Luxe MATE Scroll Multimedia Keyboard http://www.geniusnet.com.tw/product/product-1.asp?pdtno=515, 2005.
Belkin MediaPilot2.4GHz Wireless Multimedia Keyboard with Build-in Mouse and Infrared AV Remote http://geek.pricegrabber.com/search_techspecs_full.php/masterid=5798480, 2006.

* cited by examiner

*Primary Examiner*—Timothy Edwards, Jr.
(74) *Attorney, Agent, or Firm*—Banner & Witcoff, Ltd (57) ABSTRACT

A keyboard has a middle region that has upward longitudinal slopes rising to upper planes on both sides of the middle region. An alphanumeric section disposed in the keyboard housing generally in the middle region. The keyboard includes a first wing section and the second wing section in which each can be disposed at height of the keyboard housing at the upper plane. In one aspect, the alphanumeric section may be disposed below the height of the first and second wing section, and the alphanumeric section is laterally disposed between the first medial section and the second media section.

20 Claims, 8 Drawing Sheets

COMPUTER KEYBOARD

CROSS REFERENCE TO RELATED APPLICATIONS

This application is a continuation in part of U.S. application Ser. No. 29/233,839, filed Jul. 11, 2005 in which the contents is incorporated by reference herein.

FIELD OF THE INVENTION

The present invention pertains to a computer keyboard configured for navigation of a graphical user interface of a host computer.

BACKGROUND OF THE INVENTION

Conventional computer systems, especially computer systems using graphical user interface (GUI) systems, accept user input from a conventional input device, such as a keyboard for entering text, and a pointing device, such as a mouse for operating the graphical user interface.

A traditional notion of user interaction is generally in front of a desktop computer or at least sitting within close viewing proximity to a display screen as with laptop computers. Conventional systems are problematic in meeting the challenge of the new user interaction. The evolution of new media models of computing, such as digital television, digital music, digital movies, have changed the traditional view of the GUI, and the manner in which users can interact with their computers. In one example of a home theater environment, users may be sitting at a couch at distance away from a display screen. At one time, the users may want to manipulate a GUI to obtain and watch live TV or recorded TV, digital home movies and picture slideshows, and watch DVDs movies. In this "lap use" or "couch-use" environment, a traditional notion of desktop user interaction can be inefficient and frustrating for many individuals. While the user may attempt to employ a traditional handheld remote control, it provides limited cursor control, if any, for computing tasks using traditional graphical user interface. At another time, users may want to switch to productivity activities such as entering and editing text, but may find it awkward and inefficient to attempt to use a traditional remote control. Also without a desktop or work surface, a "regular" mouse is simply not a viable option for the user. Thus, the users do not realize the full benefits of experiencing new media and productivity software.

What is needed is an apparatus and method to support user interaction for with a keyboard at a distance from display screen for manipulating the GUI for the new media technologies and productivity activities, such as creation and modification of electronic documents, spreadsheets, database fields, drawings, photos and the like.

SUMMARY OF THE INVENTION

The present invention pertains to a computer keyboard configured for navigation of a graphical user interface of a host computer.

In one aspect, the top surface of the keyboard has a generally flat middle region that has upward longitudinal slopes rising to upper planes on both sides of the middle region. An alphanumeric section disposed in the keyboard housing generally in the middle region. The keyboard includes a left wing section and the right wing section in which each can be disposed at height of the keyboard housing at the upper plane. In one aspect, the alphanumeric section may be disposed below the height of the left and right sections, and the alphanumeric section is laterally disposed between the first section and the second section.

In one aspect, the keyboard includes a first large grouping, with two longitudinally spaced groupings on the upper planes. A longitudinally straight row of keys extends behind the first grouping. The two groupings of the upper plane has column of keys front to back.

Thus, aspects and features of the present invention enable users to enjoy experiences of rich digital media and gaming with a computer system and navigate the Internet, send and receive electronic mail messages or Instant Messaging, run spreadsheets, create documents and presentations with ease of operation in a new media environment.

The above and other aspects, features and advantages of the present invention will be readily apparent and fully understood from the following detailed description illustrative embodiments in conjunction with the accompanying drawings, which are included by way of example, and not by way of limitation with regard to the claimed invention.

DETAILED DESCRIPTION OF THE INVENTION

Illustrative Operating Environment

A peripheral device, such as a keyboard, may be operatively connected to a host computer and includes input devices which are configured for freeform cursor control or scrolling for moving an image in multiple axes relative to a display screen. In one aspect, a keyboard provides a physical hierarchical layout for ease of control and operation. The top surface of the keyboard has a generally flat middle region that has upward longitudinal slopes rising to upper plane surfaces on both sides of the middle region. The upper plane surfaces are generally flat. A right wing section including the right upper plane and left wing section including the left upper plane are disposed at a predetermined elevation above an alphanumeric section which is disposed in the middle region of the keyboard. The keys include a first large grouping in the middle region, with two longitudinally spaced groupings disposed the upper planes. A longitudinally straight row of keys extends behind the first grouping in the middle region. The two groupings of keys in the upper plane may include a column of keys in a front-to-back configuration. Various aspects of the present invention may at least be described in the general context of apparatus and computer-executable instructions, such as program modules, executed by one or more computers or other devices.

Accordingly, it may be helpful to briefly discuss the components and operation of a general purpose computing environment on which various aspects of the present invention may be implemented. Such an illustrative host computer system is illustrated in FIG. 1.

Figure 1:
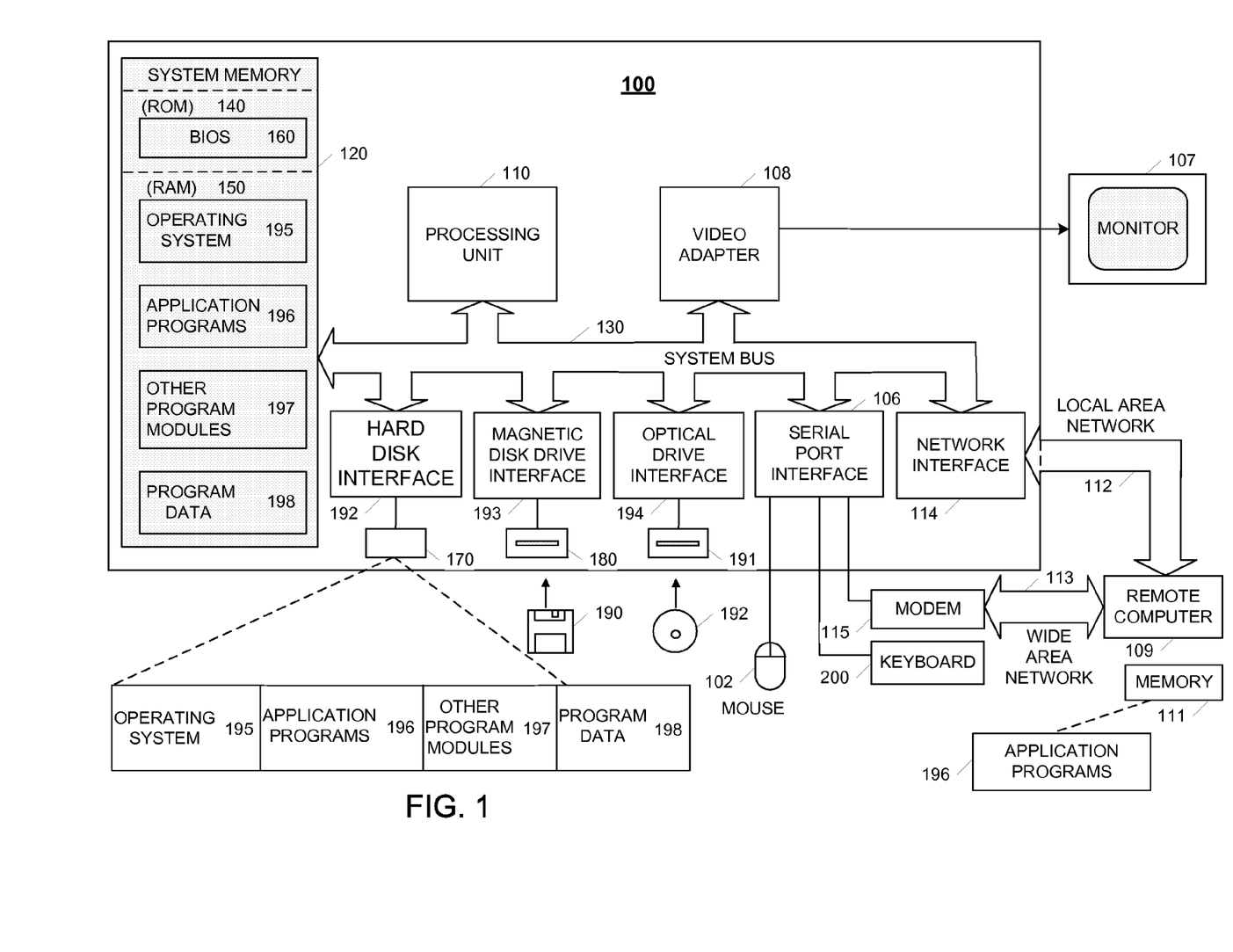
FIG. 1 is a functional block diagram of an illustrative general-purpose digital computing environment in which one or more aspects of the present invention may be implemented.

Accordingly, FIG. 1 illustrates a schematic diagram of an illustrative general-purpose digital computing environment that may be used to implement various aspects of the present invention. In FIG. 1, a host computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 200 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device with a display screen is also connected to the system bus 130 via an interface, such as a video adapter 108.

The computer 100 may operate in a networked environment using logical connections to one or more remote computers, such as a remote computer 109. The remote computer 109 may be a server, a router, a network PC, a peer device, or other common network node, and may include many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Keyboard Environment

Figure 2:
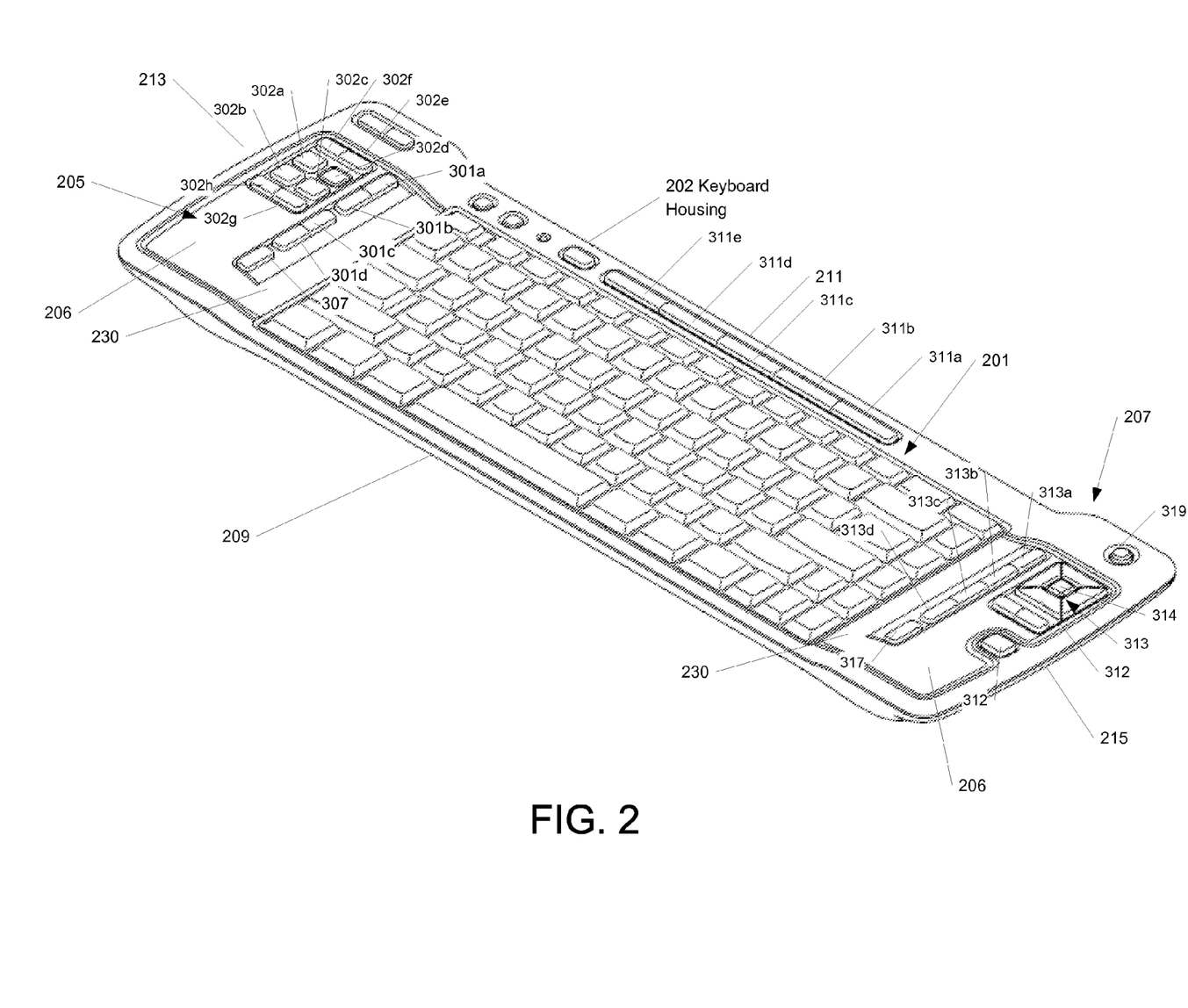
FIG. 2 is a perspective view of a keyboard according to one or more aspects of the present invention.
Figure 3:
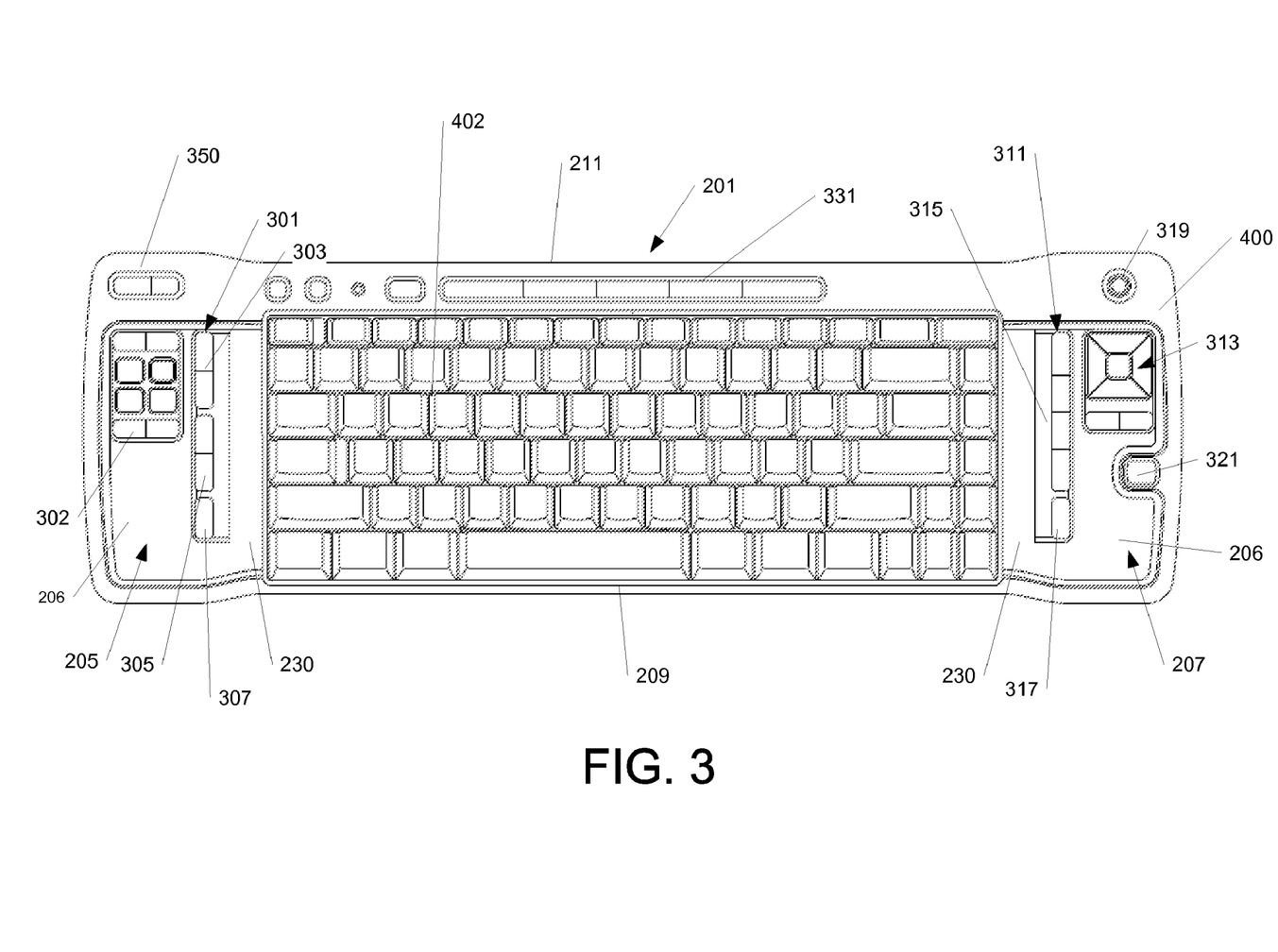
FIG. 3 is a top view of the keyboard of FIG. 2.

A keyboard in accordance with one or more aspects of the present invention is shown in FIGS. 2-8. Referring to FIGS. 2-3, keyboard 200 may include a middle section or region 201, a left wing section 205, and a right wing section 207. The left wing section 205 and right wing section 207 may include one or more keys or controls for controlling a media device function, such as digital video, digital audio, broadcast television, satellite television, or host computer 100. For frame of reference purposes, the keyboard 200 and other keyboard designs herein include a front edge 209 adjacent the user during normal use, and a back edge 211 distal from the user during normal use. Accordingly, an object is said herein to be "behind" another object when it is between that object and the back edge 211. An object is said herein to be "directly behind" another object when it is between that object and the back edge 211 and at least partially located within the lateral bounds of that object extending in the front-to-back direction. An object is said herein to be "in front on" another object when it is between that object and the front edge 209. Further, the keyboard 200 also a left edge 213 and a right edge 215. The direction "lateral" defines the general directions from the left edge 213 to the right edge 215 and from the right edge 215 to the left edge 213.

In one arrangement, the middle section 201, referred to as an alphanumeric or QWERTY section, includes an arrangement of keys for each of the letters of the English alphabet, each of the digits 0-9, and various punctuation symbols. Nevertheless, other key placements and characters of languages in lieu of English may be used. An editing portion may be provided that includes four arrow keys, and Delete, PageUp, and PageDown keys. Nevertheless, other keys can be provided.

Figure 8:
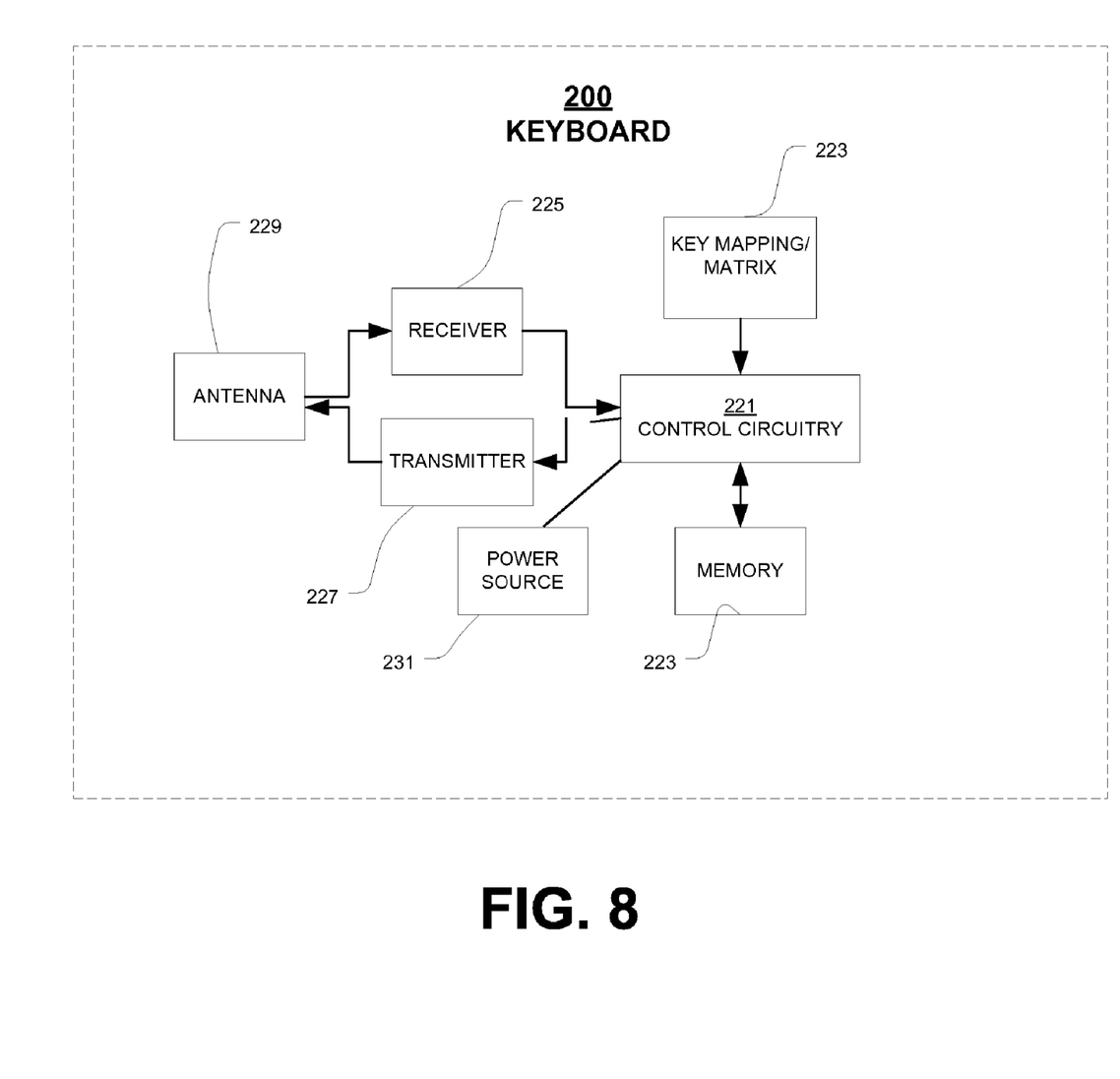
FIG. 8 is a functional block diagram of a wireless communication environment of a keyboard.

Referring to FIG. 8, the keyboard 200 can have wired or wireless connections to the host computer 100 as known in the art. Keyboard 200 may include hardware and software configured to recognize which key is activated in the key mapping/matrix 223 and process electrical input. The control circuitry 221 includes one or more microprocessors (not shown) as known in the art for operating on electrical input.

Control circuitry 221 is operatively connected to receiver 225, transmitter 227, and memory 223. The memory 223 may be any programmable type in which nonvolatile storage can be electrically erased and reprogrammed. Possible alternatives include flash memory, flash ROM, RAM with battery backup from the electric power source 231.

It should be recognized that the terms transmitter, receiver and antenna are used for ease of explanation in that they may be embodied in many different alternatives forms. For example, a transmitter and a receiver can be embodied as a transreceiver or a bi-direction communication data port, such as with infrared communications. An antenna can be embodied for receiving or sending radio frequencies. Alternatively, an antenna can be embodied as a lens for infrared communication. With continued reference to FIG. 8, the receiver 225, transmitter 227 and antenna 229 provide a function of allowing the keyboard base 204 to connect wirelessly to the host computer 100 (See FIG. 1) at a proximate distance. An operable distance may be approximately one foot to eighteen feet between and keyboard 200 and host computer 100. The operable distance can vary depending on a number of factors to include signal strength, obstructions in the transmission path, battery power, and the like. The receiver 225 is operatively coupled to the antenna 229 for receiving a wireless communication transmission including keystroke data, such as key scan codes or other data. The transmitter 227 is also operatively coupled to the antenna 229 for sending a wireless communication transmission or message, such key scan codes or other data.

It should be recognized that host computer 100 includes a receiver and a transmitter (or a transceiver) operatively coupled to the processing unit 110 via the system bus or serial connection. The wireless connection may include infrared frequencies or radio-controlled frequencies, such as Bluetooth radio-frequency ("RF") specification and protocols. One type of wireless connection may be the widely available communication standards such as, the Infrared Data Association ("IrDA") specification and protocols, such as IrDA Data or IrDA Control. The IrDA communication protocols provides low-cost, short-range, cross-platform, point-to-point communications at various transfer rates for devices employing the standardize protocol. There are various suppliers of IrDA compatible hardware for transceivers and interfacing software modules. Nevertheless, the wireless connection may radio frequency based. The radio-controlled configuration may include a transmitter 227 and receiver 225 operating at 27 MHz, but other alternative frequencies may be implemented. Further, it is contemplated that keyboard system 200 may have Wi-Fi capability such that it can be communicate via a wireless network using 802.11b protocol to host computer 100. Nevertheless, any appropriate wireless transmission protocol or wireless medium arrangement can be employed to connect keyboard 200 to host computer 100 for operation.

For reference purposes the term "scrolling" is used herein to describe the movement of an image relative to a display screen in a particular direction. For example, the term "scroll down" as used herein relates to moving the contents of a current display screen down an amount. Similarly, the terms "scroll up", "scroll left" or "scroll right" pertain to moving the contents of the screen an amount in these directions. The term scrolling as used herein also includes panning, which is the automatic scrolling of an image. The term "cursor control" is used herein to describe the movement of a graphical object, insertion point, or point of mouse operation relative to a display screen in a particular direction.

Figure 4:
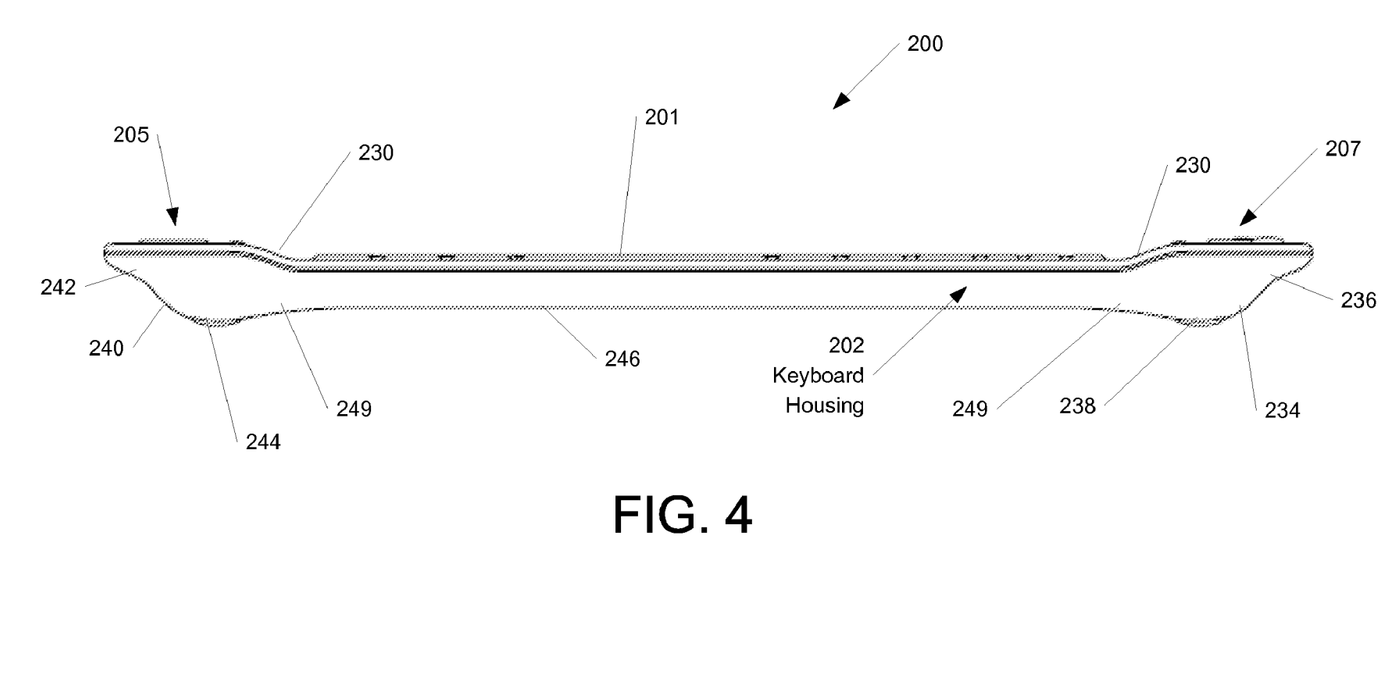
FIG. 4 is a front view of the keyboard of FIG. 2.
Figure 5:
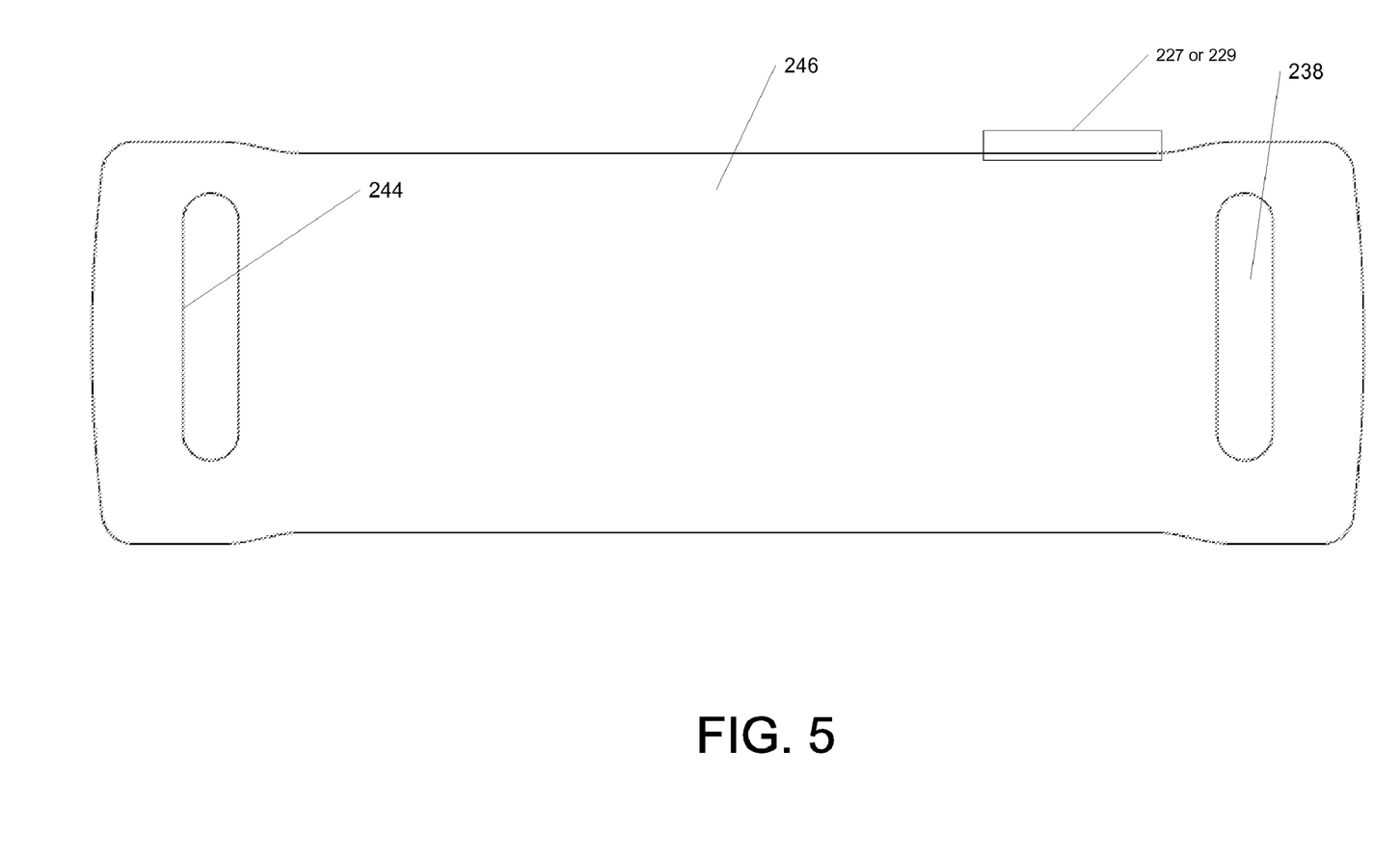
FIG. 5 is a bottom view of the keyboard of FIG. 2.
Figure 6:
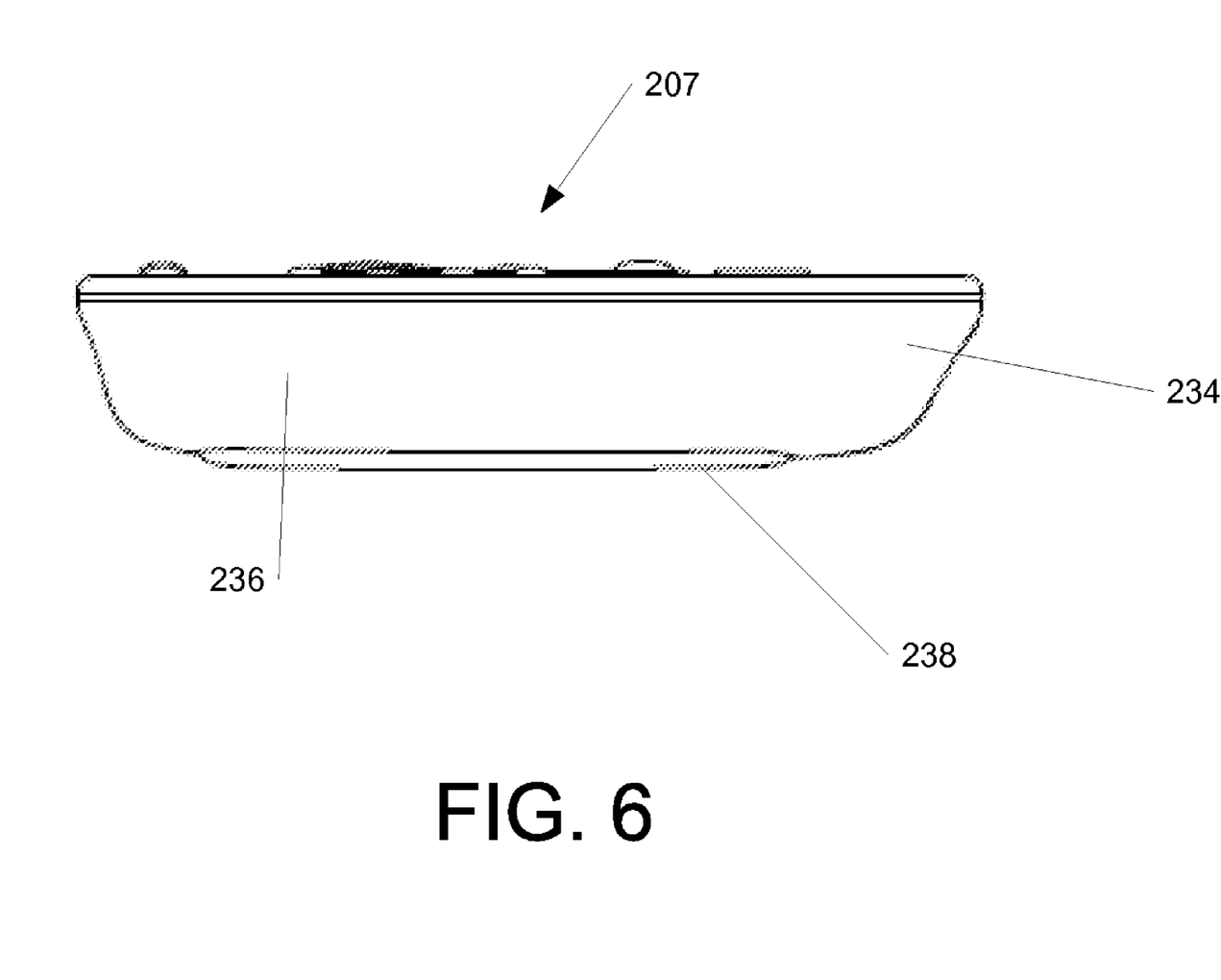
FIG. 6 is a right side view of the keyboard of FIG. 2.

Referring to FIGS. 2-4, the keyboard 200 provides a physical hierarchical layout for ease of control and operation by a user. In one arrangement, the top portion of the keyboard 200 has a middle region 201 that is generally flat on a horizontal plane. Nevertheless middle region 201 could have other arrangements. Ramp portions 230 generally comprise upward longitudinal slopes that rise to the wing sections 205, 207 on both sides of the middle region 201. In one arrangement, the wing sections 205, 207 may include upper planes 206 that are generally flat. Nevertheless, other surface shapes of the upper planes are possible. In one arrangement, the left wing section 205 and right wing sections 207 are raised above the middle region 201.

In one configuration, the upper planes 206 in the wing regions 205, 207 can be at a predetermined elevation "H" above a base surface of the middle region 201 such that the upper planes are generally co-planar or provided on the same horizontal plane. In a configuration, "H" may range between about 5.0 mm to 9.0 mm. In another configuration "H" may range between about 6.0 mm to 8.0 mm. In another configuration, "H" may range between 6.5 mm to 7.0 mm. (See FIG. 7). Stated another way, the middle region 201 is disposed below the two other sections 205, 207 in a valley or recess. This configuration disposes the most used keys in an efficient location during a user experience with a graphical user interface environment. In one aspect, the different elevation of the media sections 205, 207 above middle region 201 reduces user finger fatigue. The thumbs of the user, which may be used to control keys in the wing regions, travels less vertical and lateral distance to the top of the keys in the media section 205, 207. In one arrangement the height of the right and left media sections 205, 207 is above a horizontal plane defined by the tops of the keys of the alphanumeric section.

In one arrangement referring to FIGS. 2-4, the keyboard 200 includes a pair opposed ramp portions 230 having front-to-back surfaces which slope upwardly from the middle section 201 to the elevation of the left wing section 205 and right wing section 207. The ramp portions 230 provides for a comfortable thumb rest when the user is gripping the right and left sides of the keyboard 200. The ramp portions 230 have a generally flat slope or incline configuration. In another arrangement, the ramp portions 230 may have a concave configuration extending from the ends of the middle section 201 to the elevation of the plane of the wing sections 205, 207. In an alternative arrangement, the ramp portions 230 may include a concave portion and a generally flat incline that extends up to the height of the wing sections 205, 207. The concave arrangement provides a surface for resting the thumb or holding the keyboard with one hand.

Figure 7:
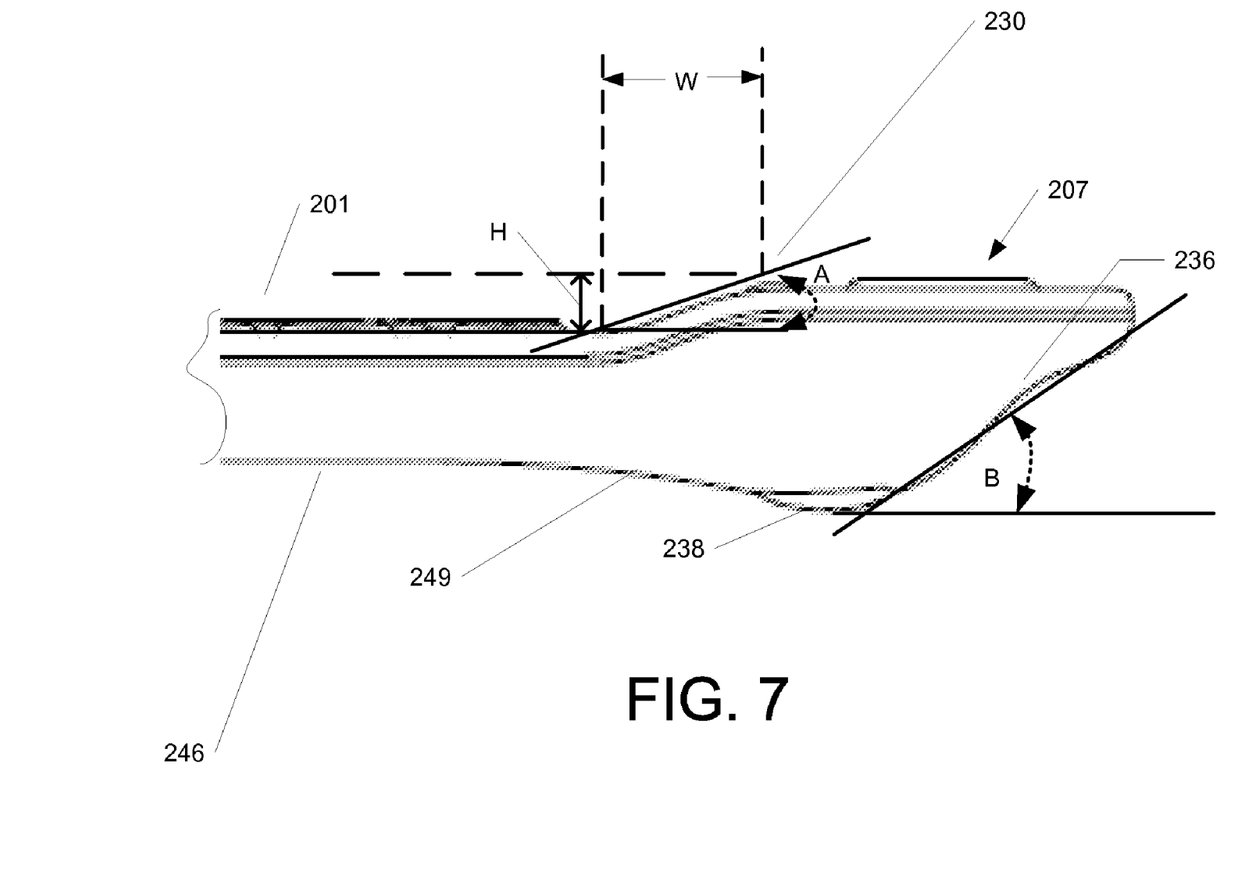
FIG. 7 is an enlarged fragmentary view of the right front of the keyboard of FIG. 2.

In one arrangement referring to FIG. 7, an angle of orientation "A" of the ramp portions 230 may range from 30 to 50 degrees upward slope with respect to a generally flat planar surface of the middle section 201. In another arrangement, the angle of orientation may range from about 43-45 degrees. Nevertheless, other angles are possible within the scope thereof. The width "W" (lateral) of the ramp portions 230 can be provided to range from 1.0 cm to 3.0 cm. In another arrangement, the width "W" (lateral) of the ramp portions 230 can be provided to range from 1.5 cm to 2.5 cm. In an alternative arrangement, the width "W" (lateral) can be provided to range from 1.75 cm to 2.0 cm. In yet another arrangement, the width "W" (lateral) can be provided for a general size of a thumb of a user. Nevertheless, other width values are possible. In one aspect, the downward sloping surface provides for the user of grip the keyboard in a cantilevered manner with one hand.

Referring to FIGS. 4 and 7, the left side and right side of the keyboard housing 202 are configured for ease of user gripping and control of keys disposed on the top of the keyboard. For ease of explanation, FIG. 7 shows the right side surfaces configuration of the keyboard in that the left side surface is basically the same. As shown in FIG. 4, in one arrangement, the right side surface has a compound arcuate configuration that includes a concave contour 236 extending downward to a convex contour 234 which terminates at a right bottom grip portion 238. Likewise, left side surface has a multiple arcuate configuration that includes a concave contour 242 that extends downward to a convex contour 240 which terminates to a left bottom grip portion 244. The left bottom grip portion 244 and right bottom grip portion 238 protrude from the bottom surface 246 of the keyboard housing 202.

In one arrangement, the left bottom grip portion 244 and the right bottom grip portion 238 may comprise a resilient material for the fingers of a user to grasp and for providing a comfortable tactile feel. Rubber or other elastic material could be used for the grip portions 238, 244. In operation of the keyboard, the user can grip the sides of the keyboard in such a manner that the right edge 215 and left edges 213 rest in the palm of a user's right and left hand, respectively. At the same time, the distal portion of the fingers (e.g., phalanges) of the user can reliably engage the right and left bottom grip portions, respectively. As shown in FIG. 7, in one arrangement, an angle of orientation "B" of the right and left surfaces may range from 30 to 50 degrees upward with respect to the distal end of the bottom grip portion 238. In another arrangement, the angle of orientation may be 43-45 degrees. Nevertheless, other angles are possible within the scope thereof.

Referring to FIGS. 4 and 7, the keyboard 200 has a bottom surface 246. In one configuration, the bottom surface 246 has a generally flat middle portion with opposing arcuate portions 249, such that an inward arc (e.g., concaved) is formed between the two longitudinally spaced grip portions 238, 244 that protrude from the bottom surface 246. In one aspect, the arcuate portion 249 to the grip portions 238, 244 provides for a comfortable and reliably stable platform in the lap of a user in which arcuate surfaces engages legs of the lateral sides of the legs of user. In another aspect, the bottom grip portions 238, 244 also serve as resilient feet for resting the keyboard on the lap of a user or on a horizontal surface, such as a table and the like.

Referring to FIGS. 1 and 3, the left wing section 205 includes a columnar strip 301 of media keys provided laterally adjacent to a media device control portion 302. The columnar strip is disposed in a front to back arrangement. A columnar strip is defined to include at least two keys aligned linearly and each having a longer length (front-to-back) than width (laterally). State in another way, the columnar strip includes a key have length (L) to width (W) ratio of greater that 1.0. In one example configuration, a key in columnar strip may have a length of 1.5 cm and width of 0.50 cm. In such a configuration the length to width ratio is 3.0. In another configuration, a key in columnar strip may have a length of 3.0 cm and width of 0.50 cm. In this case, the length to width ratio is 6.0. Nevertheless, the length-to-width ratio can range between 2.0 to 7.0.

In one aspect, the keys within columnar strip 301 are provided in key clusters 303, 305. Referring to FIGS. 2 and 3, an Audio/Visual control cluster 303 which provides for a keys of controls for up volume 301a and down volume 301b and a key cluster 305 for up/down channels navigation or stations for television or radio operation 301c-d. An audio mute key 307 can be provided in the lateral bounds of the columnar strip 301. Media device control portion 302 includes keys 302a-h configured for playback of media, such as digital video disks, musical compact disc, slide shows, digital video recorder, and other media. For example, some of the functions of control portion may include "Play" 302a, "Pause" 302b, "Stop" 302c, "Record" 302d, "Skip Forward" 302e, "Skip Back" 302f, and "Fast Forward" 302h and "Fast Back" 302g. Other similar control functions and arrangements are possible. In another aspect, disposed to the rear of the keyboard is a lateral key cluster 350 may be provided directly behind the media control portion 301. The lateral key cluster 350 includes keys which provide a "left-click" and "right-click" mouse functionality. Nevertheless, in lieu of the key cluster 350, a scroll wheel device which allows at least scroll-up, scroll-down functionality can be provided in the general location. Scroll-right and Scroll-left functionality can be provided. This configuration directional control of the graphical user interfaces on the left side of the keyboard.

The right wing section 207 includes a columnar strip 311 of keys, such as mode switching keys, provided immediately adjacent to a media portion 313, such as serving of navigational control or other control. The columnar strip 311 is disposed in a front-to-back arrangement. In one aspect, the mode switching keys 311a-d are provided in a columnar key cluster 315. The columnar key cluster of mode switching keys may include functionality, such as live TV mode 313a, a recorded TV mode 313b, an electronic program guide mode 313c, and a DVD menu control mode 313d. An instant messenger mode key 317 may be provided within the columnar key cluster 311 or in front of the columnar key cluster 311. The media portion 313 may include a key cluster arrangement four trapezoidal shaped keys 312 generally forming a shape of a square or at least a portion of a square (e.g., at least three sides of the square and a part of the fourth side is formed). In one arrangement, media portion 313 includes of directional arrows and an interior selection enter button. This media portion 313 can be used for scrolling of an image, such as scroll-left, scroll-right and up and down. Nevertheless, disposed to the rear of the keyboard is a cursor control device 319 may be provided directly behind the media portion 313. Nevertheless, the cursor control device may be D-pad, trackball type device, touch pad, or a thumb pad area that reads thumb movement with the use of and optical engine and the like. If desired, a start key 321 for initiating a graphical user interface may be provided in the front of the keyboard.

Hence, keyboard 200 can control many different devices, such as televisions, digital video disk players, digital video recorders, satellite receivers, audio compact disk players, surround sound audio and video systems and the like. In operation, control circuitry of keyboard 200 is programmed to selectively address different electronic devices for control the keys are depressed or otherwise engaged. The front-to-back columnar arrangement of the keys in the media sections 205, 207, advantageously enables a finger of a user (e.g., thumb) to easily move in a linear motion between the keys. This configuration provides for reduced muscle fatigue of the finger of a user.

Referring to FIG. 3, a lateral strip 331 of hotkeys can be provided near the back edge 211 of the keyboard 200 behind the alphanumeric section 201. The hotkeys 331 can includes a "My Music" key 331a, a "My Radio" key 331b, a "My Pictures" key 331c, a "My Videos" key 331d and a "My TV"

key 331e. These keys can be provided a lateral key cluster or in a linear arrangement with spacing between the keys. The hotkeys are understood to selectively invoke different processes or directories or locations of physical media associated with the indicia of the key. For example, a depression of a "My Music" key links to a directory of digital audio files. In another example, a depression of a "My Picture" key links to a directory of digital image files. In another example, a depression of a "My Videos" key links to a directory of digital video files.

Referring to FIG. 3, the top surface of the keyboard 200 includes an outer frame region 400 and an inner frame region 402. The outer frame region 400 is disposed along the perimeter of the keyboard 200. The inner frame region 402 is disposed within the interior bounds of the outer frame region 402. This arrangement provides an associative functional configuration such that the user's eye and hands can better associate the functional areas of the keyboard for use. In case arrangement, columnar strip 301 and 311 are disposed in the inner frame region 400. In the right wing section 207, columnar strip 311 and key 317 and media portion 313 are disposed in the inner frame region 402 and start key 312 and cursor control device 319 are disposed in the outer frame region 400. In the middle section 201, the alphanumeric keys are disposed within the inner frame region 402 and the row of laterally disposed hotkeys 331 is disposed within the outer frame region 400. In the left wing section 205, the columnar strip 301 and media device control portion 302 are disposed in the inner frame region 402 and the lateral key cluster 350 is disposed in the outer frame region 400. In one arrangement, the outer frame region 400 may have a first color and the inner frame region 402 may have a second color. The first color and the second color can be different to provide enhanced associative linkages of the functions.

The keys for keyboard 200 are operable to provide the desired commands to the system according to a known arrangement such as the generation of an electrical signal indicative of the character, symbol, or command associated with that key, such as a touch sensitive panel. Additionally, while the keys as shown are preferably of size and shape for computer keyboards, it is recognized that any or all of the keys may be alternative sized and/or shaped. For example, some or all of the keys may be oval shaped, prismatic and the like.

Illustrative Scenarios

Aspects of the keyboard allow persons use to computers and the graphical user interface to access and enjoy a broad selection of digital media and other digital entertainment media. For example, a GUI can allow users to browse a personal music library by artist and genre. In some cases, the information presented can be wider than the width of the display screen (television screen) and the user may want to scroll vertically and horizontally across the screen to see the entire digital library or other data. Advantageously, the user can move the image horizontally across the display screen to see and enjoy their music or video program with ease. Further, the user may also have cursor control to move and edit or select graphical objects. This is in contrast to conventional systems in which, the user must stop what he or she is doing and perform a number of tedious and potentially frustrating steps. Thus, aspects of the present invention can reduce delays and user frustration and unnecessary stress of manipulating conventional systems.

SUMMARY

Aspects and features enable users to enjoy experiences of rich digital media, or gaming with a computer system and navigate the Internet, send and receive electronic mail messages or Instant Messaging, run electronic spreadsheets, create electronic documents and presentations with ease of operation in a new media environment.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. A computer keyboard configured for navigation of a graphical user interface of a host computer, comprising:
   a keyboard housing having an alphanumeric section and left and right wing sections on opposing lateral sides of the alphanumeric section,
   a left wing section and the right wing section each including at least one key, and each wing section being disposed at a height above keys in the alphanumeric section.

2. The computer keyboard according to claim 1, wherein the left wing section and the right wing section are generally co-planar.

3. The computer keyboard according to claim 1, wherein the keyboard housing includes at least one ramp portion extending upward from the alphanumeric section to the height of the left and right sections.

4. The computer keyboard according to claim 3, wherein the least one ramp portion has a concave configuration.

5. The computer keyboard according to claim 1, wherein the keyboard housing includes a left ramp portion extending upward from the alphanumeric section to the height of the left wing section, and a right ramp portion extending upward from the alphanumeric section to the height of the right wing section.

6. The computer keyboard according to claim 5, wherein a lateral width of the ramp portions ranges about 1.0 cm to 3.0 cm.

7. The computer keyboard according to claim 5, wherein the keyboard housing includes a bottom surface and a right side surface having a concaved portion associated with the right wing section.

8. The computer keyboard according to claim 7, further comprising a bottom grip protruding from the bottom surface of the keyboard housing and the bottom grip being disposed proximate to the concaved portion of the right side surface.

9. The computer keyboard according to claim 2, wherein the right wing section includes a columnar key cluster.

10. The computer keyboard according to claim 9, wherein the columnar key cluster comprises modes switching keys for at least one of viewing broadcast television, recorded television, or operating an electronic program guide associated with the host computer.

11. The computer keyboard according to claim 10, wherein the at least one key of the left wing section is included within a columnar key cluster.

12. The computer keyboard according to claim 11, comprising a transmitter for wireless communication to a host computer.

13. The computer keyboard according to claim 1, wherein the at least one key further comprises a key cluster of trapezoid shaped forming a least a portion of a shape of a square.

14. A computer keyboard configured for navigation of a graphical user interface of a host computer, comprising:
 a top surface of the keyboard having a middle region that has upward lateral slope portions rising to an upper plane on lateral sides of the middle region, in which the upper planes include generally flat surfaces, and the upper planes are substantially parallel and co-planar at a height above the middle region;
 an alphanumeric section disposed in the middle region; and
 a key group including trapezoidal shaped keys forming at least a portion of a square and an interior area of the key group defining a square shaped area, and a second key including at least a cursor control device in which the key group and second key are disposed at the respective upper planes.

15. The computer keyboard according to claim 14, wherein the slope portions are concaved.

16. The computer keyboard according to claim 14, wherein the upper plane including the key group includes a columnar key cluster comprising modes switching keys for at least one viewing broadcast television, recorded television, or operating an electronic program guide associated with the host computer.

17. The computer keyboard according to claim 14, which at least one of the media key groups are provided in a columnar key cluster.

18. The computer keyboard according to claim 14, wherein the keyboard a bottom surface and a first side surface having a concaved portion associated with the at least one upper plane of the top surface.

19. The computer keyboard according to claim 18, further comprising a bottom grip protruding from the bottom surface of the keyboard and the bottom grip being disposed proximate to the concaved portion of the first side surface.

20. The computer keyboard according to claim 14, further comprising a row of laterally disposed hotkeys being disposed in the middle region, and wherein the upper surface of the keyboard includes an outer frame region and an inner frame region, the alphanumeric section, the key group and the second key being disposed in the inner frame region, and the row of hotkeys disposed in the outer frame region.

* * * * *